Inventor:
Charles A. Stickney
By Wilson & McCanna
Attys.

Patented Aug. 20, 1929.

1,725,110

UNITED STATES PATENT OFFICE.

CHARLES A. STICKNEY, OF ROCKFORD, ILLINOIS, ASSIGNOR TO STICKNEY HYDRAULIC CO., OF ROCKFORD, ILLINOIS, A CORPORATION OF ILLINOIS.

WATER SOFTENER.

Application filed March 17, 1927. Serial No. 176,021.

This invention relates to base-exchange water softeners and more particularly those of the automatic or semi-automatic type.

The principal object of the present invention is to provide a novel method and means for regenerating a water softener wherein a variable amount of brine proportionate to the amount of water softened during each run and to the hardness of the water is provided for each regeneration, as distinguished from the conventional method of providing a fixed amount of brine for each regeneration and metering a certain fixed amount of water for the capacity run of softening, the amount of water being usually proportioned roughly according to the hardness thereof. Obviously, my novel method enables regenerating at fixed intervals of time, or according to any other desired scheme, and upon each regeneration the amount of brine will be directed proportionate and proper for the degree to which the softening material has been exhausted. There can be no wasting of brine nor, on the other hand, will there be a shortage of brine in regenerating the softener.

According to my invention a brine reservoir is provided into which brine is pumped at each occasion of drawing water, the amounts of brine being proportionate to the amounts of water drawn and being further proportionate in amount to the hardness of the water. A pump operated by a water motor or meter measuring the water as it is drawn pumps the brine into the reservoir and is, of course, operated in proportion to the amount of water used. The capacity of the pump is variable so as to proportion the amount of brine to the hardness of the water being softened.

Another important object of the invention consists in the provision of novel means under clock control for throwing the softener into regeneration at fixed intervals of time so that the softener will require no attention on the part of the user, but will automatically go into regeneration at a certain fixed time every day, every other day, or at whatever intervals may be selected. A special feature in connection with this means is the provision of a manually operable device for throwing the softener into regeneration at any time independently of the clock control to suit the convenience of the operator, thus making the softener capable of semi-automatic operation.

Other phases of the invention which have more particular reference to details of construction or arrangement tending toward compactness, neatness in appearance, cheapness in construction, serviceability, etc., will be brought out in the course of the following description in which reference is made to the accompanying drawings wherein—

The same reference numerals are applied to corresponding parts throughout the views.

Figure 1:
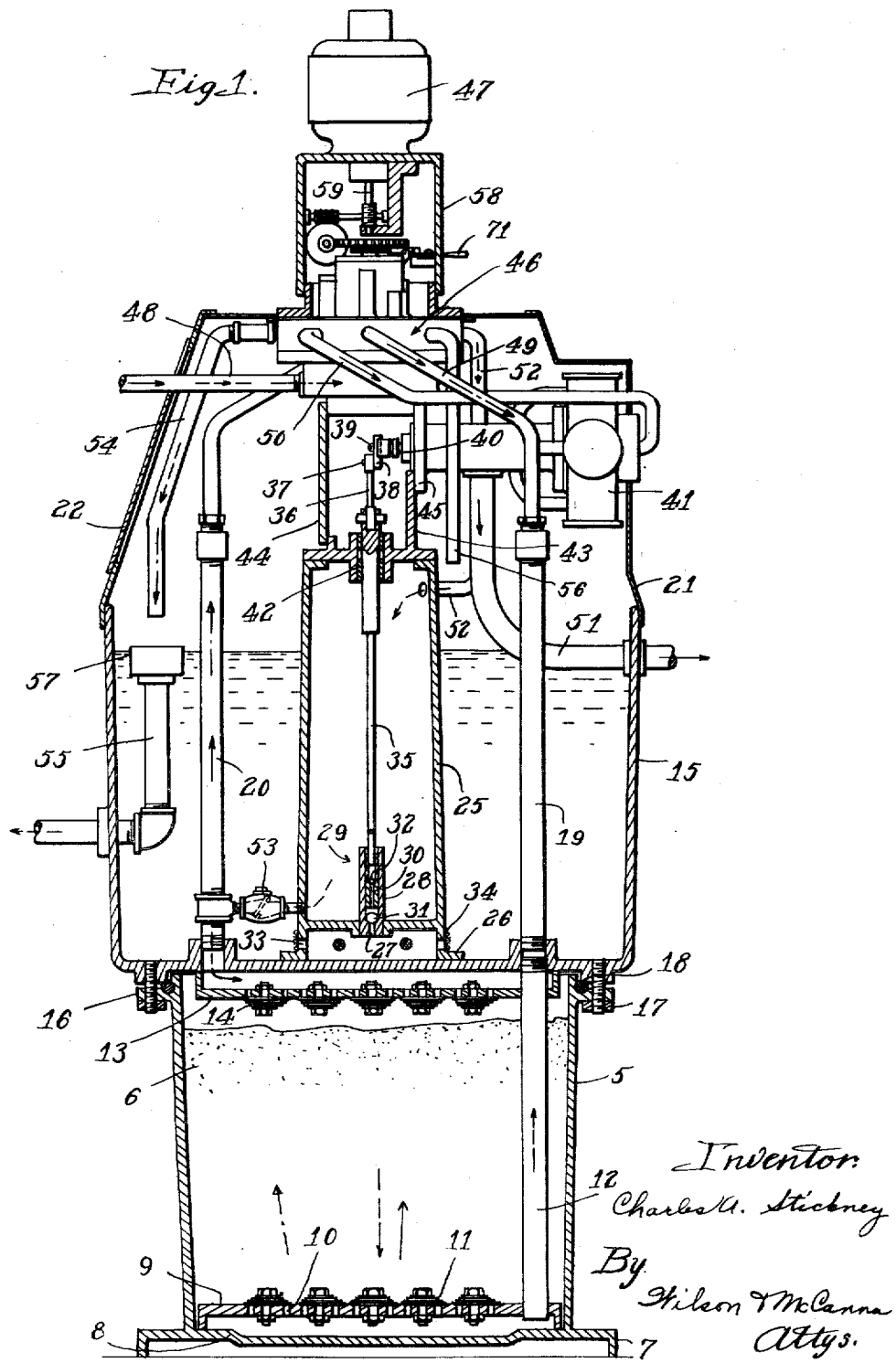
Figure 1 is a central vertical section through a water softener embodying my invention.

The softener as shown in Fig. 1 comprises a cast softener tank 5 containing the bed of zeolite or other water softening material 6. The tank 5 has a broad base portion 7 to insure stability and has the bottom wall 8 thereof suitably depressed to form a basin beneath an injector plate 9 suitably secured in the bottom of the tank 5 within the latter. The plate 9 has a plurality of openings 10 beneath injector nozzles 11 mounted on the plate. The nozzles 11 form the subject matter of a copending application Serial No. 184,519, filed April 18, 1927, and it will not be necessary, therefore, to describe the construction thereof except to state that the same comprises disks suitably stacked in superposed relation for the passage of the incoming water between the disks for uniform distribution throughout the cross-sectional area of the bed and passage upwardly therethrough. A pipe 12 disposed within the tank 5 has communication at its lower end with the under side of the injector plate to supply hard water for passage upwardly through the bed 6 after uniform distribution through the injector nozzles 11. Another injector plate 13 provided with nozzles 14, similar to the nozzles 11, is mounted on the under side of a salt tank 15 above the bed 6. The tank 15 is also preferably in the form of a casting in order to resist the corrosive action of the salt brine and is arranged to bolt down onto a flange 16 provided on the upper end of the tank 5. The tightening of the nuts 17 compresses a packing 18 between the flange 16 and the bottom of the tank 15 to make a water-tight joint. The pipe 12, previously referred to, threads at its upper end in an opening in the bottom wall of the tank 15 to communicate with a pipe 19 extending upwardly within the tank 15. Another pipe 20 extending upwardly within the tank 15 communicates with the softener tank 5 by way of the injector plate 13. As thus far described, it will be manifest that the piping, so far as practicable, has been confined within the two tanks so as to preserve an uninterrupted flush outside appearance for neatness. The provision of the tanks in the form of castings also insures long continuous service and avoids the likelihood of leakage. A hood 21, suitably of sheet metal, is preferably provided to fit about the rim of the salt tank 15 for the purpose of enclosing all of the piping and mechanism disposed within, or extending from, the salt tank and also for the purpose of excluding dust or dirt from the salt and brine in the tank. This hood has a door 22 which, when opened, affords access to the mechanism and enables replenishing the salt supply in the tank.

A brine tank or reservoir 25 is supported by means of its base 26 on the bottom of the salt tank approximately centrally therein. The tank 25 has a brine intake opening 27 leading into the cylinder 28 of a pump 29 for the purpose of pumping brine from the tank 15 into the tank 25 in the operation of the plunger or piston 30. The ball check valves at 31 and 32 in the cylinder 28 and plunger 30, respectively, make the pump single-acting so that one charge of brine is pumped in each reciprocation of the plunger in a manner believed to be apparent. The base 26 of the tank 25 has a number of openings 33 in the side walls thereof screened, as indicated at 34, to permit the passage of brine from the tank 15 through the openings 33 to the intake opening 27 while excluding any solid particles of salt. The plunger of the pump is connected, as by means of a rod 35, with a link 36 pivotally connected at 37 to a crank arm 38. The arm 38 is adjustably mounted, as indicated at 39, on a shaft 40 forming an extension of the crank shaft of a water motor or meter 41. The adjustable mounting at 39 provides for varying the crank radius and correspondingly varying the stroke of the pump plunger 30 to change the capacity of the pump 29 for a purpose which will be explained presently. The plunger rod 35 operates in a bearing 42 provided in the lower wall of the crank casing 43 which serves as a closure for the upper end of the brine tank 25. A removable plate 44, covering an opening in the crank casing 43, affords access to the crank adjustment through the door opening at 22. The meter 41 measures the water passing from the softener to the service system so that the pump 29 is operated on each occasion of drawing water, the amount of operation depending, of course, on the amount of water drawn so as to pump an amount of brine in direct proportion of the amount of water used. By properly adjusting the crank radius to secure a certain stroke for the plunger 30, the amount of brine which will be pumped may be varied according to the hardness of the water being softened. In other words, the amount of brine pumped is proportionate both to the amount of water used and to the hardness thereof. The meter 41 forms no part of this invention, but, briefly stated, is in the form of a radial motor arranged to be driven under the motive power of the water flowing through the softener. In the present case, as will presently appear, the motor is inserted between the softener and the service system although, of course, the same practical purpose would be served by locating the motor at any other point in the water line. With the present arrangement the motor is supported on the crank casing 43, as shown at 45.

The different circuits for the softening operation, regeneration, and flushing or rinsing are determined by a valve mechanism, indicated generally by the reference numeral 46, which is mounted on top of the crank casing 43 beneath the hood 21. The valve mechanism also forms no part of the subject matter of this application and it, therefore, will suffice to state briefly that it is of the rotary plug type having ports in the plug thereof in different planes and angularly displaced with respect to one another in proper relation to ports provided in the valve body to establish communication between pipes connected with the valve body at different points thereon. The valve is also arranged for continuous rotation from one end of a predetermined cycle to the other end when once thrown into operation under the power of a drive motor 47, but is normally, of course, stationary in the softening position. When thrown into operation upon regeneration the valve is turned from the softening position to the regeneration position, from the regeneration position to the flushing position, and finally from the flushing position back to the softening position all in one continuous cycle. The means for operating the valve under the power of the motor 47 will be described hereinafter as well as the means for automatically or manually controlling the operation of the motor for fully automatic or semi-automatic control of the water softener. Before passing to a description of this mechanism it may be well to trace the three circuits, just referred to, for softening, regeneration, and flushing.

In normal softening operation the course of the water is as follows, the course being indicated throughout with short full line arrows: The hard water supplied from the city water mains, or from any other suitable source, enters the softener through the pipe 48 and is conducted through registering ports in the body and plug of the valve 46, out through the pipe 49, down through the pipes 19 and 12 into the bottom of the softener tank 5 for passage upwardly through the bed of water softening material for softening. The injector plate nozzles serve, of course, to distribute the water evenly throughout the cross-sectional area of the bed for the most ideal intimate contact with the mineral. The softened water leaving the top of the softener tank by way of the injector plate 13 passes upwardly through the pipe 20 and through registering ports in the valve 46, out through pipe 50 into the water meter 41 to operate the latter in proportion to the amount of water used. The water leaving the meter through the pipe 51 is conducted to the service system. Manifestly, during all of the softening operation whenever the meter 41 is actuated the pump 29 is likewise operated to pump brine from the salt tank 15 into the brine tank 25 in proportionate amounts so that at the close of the softening run there is present in the brine tank an amount of brine proportionate to the amount of water used during softening. If the proper adjustment has been made as to the capacity of the pump the amount of brine will also be in proper proportion to the hardness of the water softened. The desideratum is, of course, to provide enough brine upon regeneration to revive the bed of water softening material to the same extent as it has been exhausted during the softening operation. The present method secures this result as nearly as it is practicably possible and avoids the likelihood of wasting brine or, on the other hand, of using too small an amount of brine in regeneration.

In regeneration, the valve 46 is operated to establish a new circuit which, for the purposes of convenience in tracing, is designated throughout by short dotted arrows as follows: Hard water entering through the pipe 48 is conducted through registering ports in the plug and body of the valve 46 out through a pipe 52 connected with the upper end of the brine tank 25. The incoming fresh, hard water expels the brine stored in the tank 25 through a check valve 53 into the top of the softener tank 5 for passage downwardly through the bed of water softening material. The injector plate nozzles serve, of course, to distribute the brine uniformly throughout the cross-sectional area of the bed so as to have proper intimate contact with all of the softening material to effect what is commonly termed a "base-exchange" between the brine and the water softening material so as to revive the latter. The waste brine leaving the bottom of the softener tank by way of the injector plate 9 carries with it the calcium and magnesium hardness which was assimilated by the mineral, and this brine is conducted upwardly through the pipes 12 and 19, through the pipe 49, and through registering ports in the valve 46 for discharge through the pipe 54 to the sewer. The sewer connection is shown at 55. This flow, sometimes called the "salt wash", continues for a predetermined interval determined by the period of registry of the ports in the valve plug and body as described in my co-pending application relating to the valve, above referred to. The brine having been displaced from the tank 25 by fresh water in the manner described, the tank at the close of the regeneration is, of course, filled with fresh, hard water. It will suffice to state for the present purposes that during the pumping of the brine into the brine tank during softening operation the brine pumped in displaces equal amounts of the water through the pipe 52 and through registering ports in the valve 46 for discharge into the salt tank through the pipe 56. Thus, the supply of water in the salt tank 15 to be converted into brine is continuously maintained at a constant level since the amount of brine pumped out of the salt tank into the brine tank will be equivalent to the amount of fresh, hard water displaced from the brine tank into the salt tank. A definite level is, moreover, insured by having an overflow cup 57 for the sewer connection 55 and there is, therefore, no possibility of flooding at the time of replenishing the salt supply.

During the flushing or rinsing operation still another circuit is established, as indicated by the dot and dash arrows as follows: The hard water entering through the pipe 48 is conducted through the valve 46, out through the pipe 49, down through pipes 19 and 12 into the lower end of the softener tank for passage upwardly through the bed of water softening material so as to rinse the same. The waste water leaves the top of the softener tank by way of the injector plate 13 and passes upwardly through the pipe 20, through the valve 46 for discharge through the pipe 54 to the sewer. The flushing operation also continues for a predetermined interval governed by the period of registry of the ports in the plug and body of the valve 46, it being remembered that the valve plug is turned continuously from the beginning to the end of its cycle of operation. After the rinsing operation is completed the valve is returned to the normal softening position.

Figure 2:
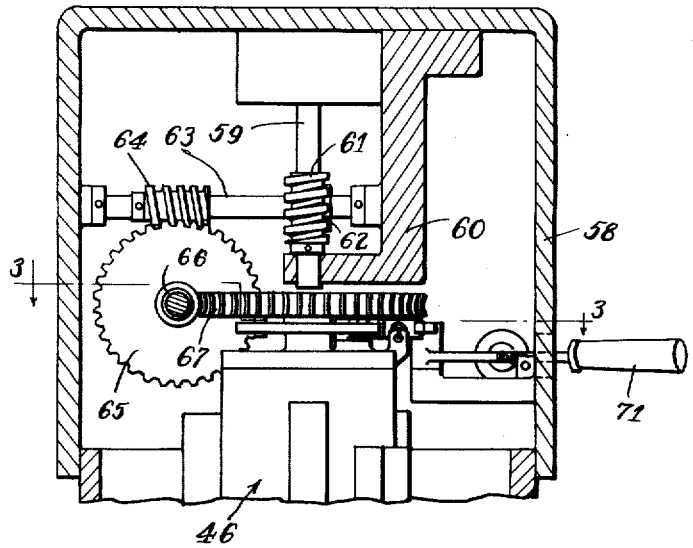
Fig. 2 is an enlarged view of the upper part of Fig. 1 showing the automatically controlled means for operating the valve mechanism of the softener.
Figure 3:
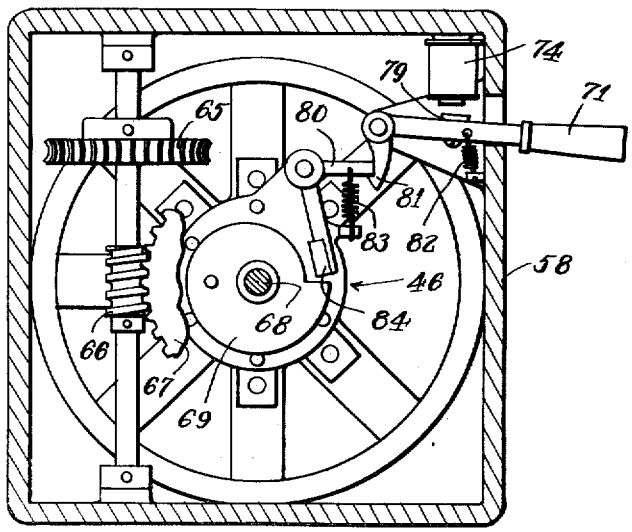
Fig. 3 is a horizontal section taken on the broken line 3—3 of Fig. 2.
Figure 4:
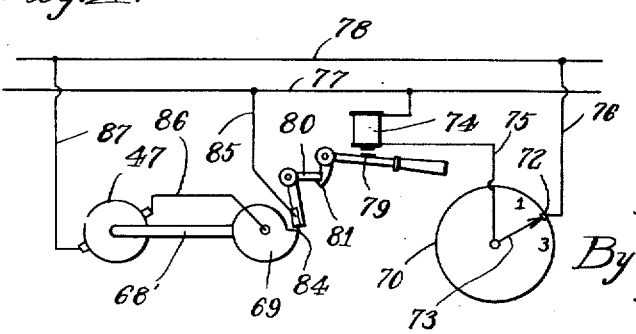
Fig. 4 is an electrical circuit diagram.

Referring now to Figs. 2–4, inclusive, it will be observed that the valve 46 has a gear box 58 supported thereon and serving as a mounting for the motor 47. The latter has its armature shaft 59, or an extension thereof, depending into the box 58 and bearing in a bracket 60 therein. A worm 61 on the shaft 59 meshes with a worm gear 62 on a cross shaft 63 also bearing at one end in the bracket 60. Through two other steps of reduction 64—65 and 66—67 the drive is transmitted to the stem 68 of the valve 46. A cam 69 is fixed to the worm gear 67 so as to turn with the stem 68. This cam insures the continuance of the operation of the motor to the end of the cycle once the operation has been initiated. The operation may be initiated either by a control clock 70 or a hand control lever 71, as indicated in the diagram in Fig. 4, in which figure the connection between the motor 47 and the cam 69 is diagrammatically represented by a shaft 68'. The clock 70 has a contact 72 through which a circuit is arranged to be completed by the hand 73 through a solenoid 74 by way of conductors 75 and 76 connected with the lines 77 and 78. The energizing of the solenoid 74 attracts the armature 79 provided on the hand lever 71 to release the latch 80 from its keeper 81 against the action of a spring 82. When the latch 80 is released a spring 83 throws a contact brush 84 into engagement with the cam 69 to complete a circuit through the motor 47 by way of the conductors 85, 86 and 87. The motor when once thrown into operation will thereafter continue to operate even though the hand 73, during the interval of regeneration, will move away from the contact 72, because the contact 84 continues to be in engagement with the cam 69. It is only at the end of the cycle of the valve movement that the contact 84 breaks the circuit by riding over the high point of the cam. The latch 80 then holds the contact in an open circuit position by reason of engagement with the keeper 81. A definite cycle of operation of the valve is thereby insured as the circuit is maintained intact until the close of the cycle when the latch 80 is reset. This operation is manifestly fully automatic and regeneration will occur at fixed intervals of time whenever the hand 73 in its travel makes contact at 72. The time for regeneration may obviously be selected to suit the convenience of the user as, for example, at two or three o'clock in the morning, at which time there is little likelihood of a need for softened water. In the event, however, that the user desires to throw the softener into regeneration at some other selected time better to suit his convenience, it will be obvious that he can accomplish this by simply throwing the hand lever 71 upwardly to release the latch 80. This will initiate the operation of the valve and the valve will be moved through the complete cycle and will be stopped automatically at the end of the cycle. In other words, such operation is semi-automatic. If desired, semi-automatic operation may also be secured by use of a push button in place of the contact making clock 70 so that the user can cause regeneration to occur at any desired time by simply pressing the button.

It is believed that the foregoing description conveys a sufficiently clear understanding of the invention and that anyone skilled in the art will readily appreciate the advantages which it derives. It is, therefore, pointed out that while a specific embodiment has been illustrated and described for the purposes of a full disclosure, it should be understood the invention is capable of various other adaptations and modifications, all of which it is the intention to include within the scope of the appended claims.

I claim:

1. In a water softener, means for passing hard water through a bed of water softening material for softening, means operated each time water is softened for withdrawing to a receptacle a proportionate amount of brine from a source of supply of brine, and means adapted upon regeneration for passing the brine contained in the receptacle through the bed of water softening material.

2. In a water softener, means for passing hard water through a bed of water softening material for softening, means operated whenever water is softened for withdrawing brine from a source of brine supply to a receptacle so that when regeneration is to occur an amount of brine will be stored in the receptacle which is larger or smaller depending upon the amount of water that has passed through during softening, and means adapted upon regeneration for passing the brine from the receptacle through the bed of water softening material.

3. In a water softener means for passing hard water through a bed of water softening material for softening, and means adapted upon regeneration for automatically passing a variable amount of brine through the bed of water softening material, dependent upon the amount of hard water passed through the bed since the previous regeneration.

4. In a water softener, means for passing hard water through a bed of water softening material for softening, and means adapted upon regeneration for automatically passing a variable amount of brine through the bed of water softening material, variable according to both the amount of hard water passed through the bed since the previous regeneration and the hardness of such water.

5. In a water softener, means for passing hard water through a bed of water softening material for softening, and means adapted at the time of regeneration, where the regenerations are to occur at definite intervals of time, for automatically passing a variable amount of brine through the bed of water softening material, dependent upon the amount of hard water passed through the bed since the previous regeneration.

6. In a water softener, means for passing hard water through a bed of water softening material for softening, and means adapted at the time of regeneration, where the regenerations are to occur at predetermined intervals of time, for automatically passing a variable amount of brine through the bed of water softening material, variable according to both the amount of hard water passing through the bed since the previous regeneration and the hardness of such water.

7. In a water softener means for passing hard water through a bed of water softening material for softening, and means adapted to operate automatically at fixed intervals of time for passing a variable amount of brine through the bed of water softening material dependent upon the amount of hard water passed through the bed since the previous regeneration.

8. In a water softener means for passing hard water through a bed of water softening material for softening, and means adapted to operate automatically at regular intervals of time fixed by a control clock for passing a variable amount of brine through the bed of water softening material, variable according to both the amount of hard water passed through the bed since the previous regeneration and the hardness of such water.

9. In a water softener means for passing hard water through a bed of water softening material for softening, means for automatically producing a variable volume of brine in proportion to the amount of water softened, and means adapted upon regeneration for causing the passage of the brine produced through the bed of softening material.

10. In a water softener means for passing hard water through a bed of water softening material for softening, means for automatically storing in a receptacle amounts of brine upon each withdrawal of water sufficient to regenerate a given volume of water softening material to the same extent as such material was exhausted by the passage of the hard water therethrough, and, means adapted upon regeneration, for passing the brine in storage through the softening material.

11. In a water softener means for passing hard water through a bed of water softening material for softening, means for pumping into a receptacle from a source of supply of brine amounts of brine in proportion to the amounts of water softened, and, means adapted upon regeneration, for passing the brine stored in the receptacle through the bed of water softening material.

12. In a water softening system the combination of a bed of water softening material, means for passing hard water through said bed and withdrawing soft water therefrom, a source of supply of brine, a brine receptacle, means arranged to operate whenever water is softened to withdraw brine from the source of supply to the receptacle in an amount proportionate to the amount of water softened, the supply of brine to the receptacle from the source being controlled by the amount of water passed through the bed, and means arranged at the end of regeneration to conduct the brine from the receptacle through the bed of water softening material.

13. A system as set forth in claim 12 wherein the means for withdrawing brine from the source of supply to the receptacle comprises a pump operated in proportion to the amount of water passed through the system for softening.

14. In a system as set forth in claim 12 wherein the means for withdrawing brine from the source of supply to the receptacle comprises a pump operated in proportion to the amount of water passed through the system for softening, the provision of means for regulating the discharge of brine from the pump to the receptacle in proportion to the hardness of the water being softened.

15. In a system as set forth in claim 12 wherein the means for withdrawing brine from the source of supply to the receptacle comprises a plunger pump operated in proportion to the amount of water passed through the system for softening, the provision of means for regulating the stroke of the plunger in proportion to the hardness of the water being softened.

16. In a water softener system the combination of a bed of water softening material, means for passing hard water through said bed and withdrawing soft water therefrom, a source of brine supply, a brine receptacle, a pump for pumping brine from the supply source to the receptacle, said pump being operated under the motive power of the water passed through the system and being arranged to pump an amount of brine proportionate to the amount of water softened, and means arranged at the end of regeneration to conduct the brine from the receptacle through the bed of water softening material.

17. In a system as set forth in claim 16 the provision of means for varying the capacity of the pump in proportion to the hardness of the water being softened.

18. In a system as set forth in claim 16 wherein the pump is of the reciprocating plunger type, the provision of means for regulating the stroke of the pump in proportion to the hardness of the water being softened.

19. In a water softener, the combination of a bed of water softening material, means for supplying hard water to said bed, means for withdrawing soft water therefrom, a source of brine supply, a brine receptacle, a pump for pumping brine from the supply source to the receptacle, means for measuring the water used during softening operation, said means causing the operation of said pump proportionately to the amount of water used, and means for causing the passage of the brine from the receptacle through the bed in regeneration.

20. In a system as set forth in claim 19 wherein the water metering means has an operating connection with the pump, the provision of means in said connection for varying the capacity of the pump in proportion to the degree of hardness of the water being softened.

21. In a water softener, the combination of a softener tank containing a bed of water softening material, a salt tank provided on top of the softener tank, said salt tank having a brine compartment also above the softener tank, means for supplying hard water, valve means for normally conducting the hard water to the bottom of the softener tank for passage upwardly therethrough, means communicating with a service system, said valve means being arranged normally to conduct soft water from the top of the softener tank to the service system, means arranged to establish communication between the lower end of the brine compartment and the upper end of the softener tank, and means communicating with the upper end of the brine compartment and arranged to be placed in communication with the source of hard water supply through said valve means during regeneration to cause the passage of the brine downwardly through the softener tank.

22. In a water softener system, the combination with a softener tank containing a bed of water softening material, means for supplying hard water to said bed, means for withdrawing soft water therefrom, and means for metering the water used, of a salt tank for providing brine, a brine tank disposed in the salt tank and having an inlet opening in the lower end thereof, a pump for pumping brine through said opening into the brine tank, and means for providing an operating connection between the pump and the water metering means.

23. In a water softener, the combination with a softener tank containing a bed of water softening material, means for supplying hard water to said bed, means for withdrawing soft water therefrom to a service system, and a source of brine supply, of means for controlling communication between the softener tank and the source of hard water supply and service system during softening operation, and between the softener tank and the brine supply source during regeneration, said means comprising a valve casing having ports therein having connection with the hard water supply, the top and bottom of the softener tank, the service system and the source of brine supply, a movable valve member in said casing having ports therein establishing communication between ports in the valve casing in a predetermined sequence for the softening operation and the regenerating operation, and means for operating said valve member from the softening position through its cycle back to the softening position, the said valve member being operated continuously from the beginning to the end of its cycle and the registering ports in the casing and valve member being graduated to provide for the proper interval of registry of the ports to insure complete regeneration.

24. In a water softening system, the combination with a softener tank containing a bed of water softening material, a brine reservoir, means for supplying hard water to the bed, means for withdrawing soft water therefrom to a service system, means adapted upon each withdrawal of an amount of soft water to supply a proportionate amount of brine to the reservoir, and means for establishing communication between the brine reservoir and the bed at the time of regeneration, of valve mechanism for controlling the fluid connections for the softener tank during softening and regeneration, means for operating said valve mechanism at the time of the regeneration, and clock controlled means for causing the operation of said means at fixed intervals of time.

25. In a water softening system, the combination with a softener tank containing a bed of water softening material, a brine reservoir, means for supplying hard water to the bed, means for withdrawing soft water therefrom to a service system, and means for establishing communication between the brine reservoir and the bed, of valve mechanism for controlling the fluid connections for the softener tank during softening and regeneration, electrical means for operating said valve mechanism at the time of the regeneration, clock controlled means for causing the operation of said electrical means at fixed intervals of time, the valve mechanism being continuously operable from beginning to end of its cycle, and means serving as a relay between the electrical means and the control clock arranged to have the electrical circuit through the electrical means completed by the control clock and maintained by the relay means from the beginning to the end of the cycle of operation of the valve mechanism.

26. In a water softening system, the combination with a softener tank containing a bed of water softening material, a brine reservoir, means for supplying hard water to the bed, means for withdrawing soft water therefrom to a service system, and means for establishing communication between the brine reservoir and the bed, of valve mechanism for controlling the fluid connections for the softener tank during softening and regeneration, electrical means for operating said valve mechanism at the time of the regeneration, clock controlled means for causing the operation of said electrical means at fixed intervals of time, the valve mechanism being continuously operable from beginning to end of its cycle, and means serving as a relay between the electrical means and the control clock arranged to have the electrical circuit through the electrical means completed by the control clock and maintained by the relay means from the beginning to the end of the cycle of operation of the valve mechanism, the said relay means comprising a manually operable part whereby to cause the regeneration of the softener independently of the control clock.

In witness of the foregoing I affix my signature.

CHARLES A. STICKNEY.

CERTIFICATE OF CORRECTION.

Patent No. 1,725,110.  Granted August 20, 1929, to

CHARLES A. STICKNEY.

It is hereby certified that error appears in the printed specification of the above numbered patent requiring correction as follows: Page 5, lines 81 and 120, claims 12 and 16, for the word "end" read "time"; and that the said Letters Patent should be read with these corrections therein that the same may conform to the record of the case in the Patent Office.

Signed and sealed this 1st day of October, A. D. 1929.

(Seal)

M. J. Moore,
Acting Commissioner of Patents.

from the beginning to the end of the cycle of operation of the valve mechanism.

26. In a water softening system, the combination with a softener tank containing a bed of water softening material, a brine reservoir, means for supplying hard water to the bed, means for withdrawing soft water therefrom to a service system, and means for establishing communication between the brine reservoir and the bed, of valve mechanism for controlling the fluid connections for the softener tank during softening and regeneration, electrical means for operating said valve mechanism at the time of the regeneration, clock controlled means for causing the operation of said electrical means at fixed intervals of time, the valve mechanism being continuously operable from beginning to end of its cycle, and means serving as a relay between the electrical means and the control clock arranged to have the electrical circuit through the electrical means completed by the control clock and maintained by the relay means from the beginning to the end of the cycle of operation of the valve mechanism, the said relay means comprising a manually operable part whereby to cause the regeneration of the softener independently of the control clock.

In witness of the foregoing I affix my signature.

CHARLES A. STICKNEY.

CERTIFICATE OF CORRECTION.

Patent No. 1,725,110.  Granted August 20, 1929, to

CHARLES A. STICKNEY.

It is hereby certified that error appears in the printed specification of the above numbered patent requiring correction as follows: Page 5, lines 81 and 120, claims 12 and 16, for the word "end" read "time"; and that the said Letters Patent should be read with these corrections therein that the same may conform to the record of the case in the Patent Office.

Signed and sealed this 1st day of October, A. D. 1929.

M. J. Moore,
(Seal)  Acting Commissioner of Patents.